US007836219B1

(12) United States Patent
Mahmoud et al.

(10) Patent No.: US 7,836,219 B1
(45) Date of Patent: Nov. 16, 2010

(54) SYSTEM AND METHOD FOR AUTHENTICATION OF EMBEDDED RAID ON A HOST RAID CARD

(75) Inventors: Fadi A. Mahmoud, Kailua, HI (US); Ganapathy S. Sridaran, Milpitas, CA (US)

(73) Assignee: PMC-Sierra US, Inc., Santa Clara, CA (US)

( * ) Notice: Subject to any disclaimer, the term of this patent is extended or adjusted under 35 U.S.C. 154(b) by 440 days.

(21) Appl. No.: 11/054,785

(22) Filed: Feb. 9, 2005
(Under 37 CFR 1.47)

Related U.S. Application Data

(60) Provisional application No. 60/543,642, filed on Feb. 10, 2004.

(51) Int. Cl.
*G06F 3/00* (2006.01)
*G06F 9/445* (2006.01)

(52) U.S. Cl. ............................................. 710/16; 713/2
(58) Field of Classification Search .................. 713/193; 710/16
See application file for complete search history.

(56) References Cited

U.S. PATENT DOCUMENTS

| | | | | |
|---|---|---|---|---|
| 5,113,518 A | * | 5/1992 | Durst et al. | 726/29 |
| 5,483,658 A | * | 1/1996 | Grube et al. | 726/29 |
| 5,530,752 A | * | 6/1996 | Rubin | 705/59 |
| 5,644,704 A | * | 7/1997 | Pease et al. | 714/42 |
| 5,734,819 A | * | 3/1998 | Lewis | 726/29 |
| 6,249,872 B1 | * | 6/2001 | Wildgrube et al. | 726/2 |
| 6,401,208 B2 | * | 6/2002 | Davis et al. | 713/193 |
| 6,425,079 B1 | * | 7/2002 | Mahmoud | 713/2 |
| 6,598,159 B1 | * | 7/2003 | McAlister et al. | 713/2 |
| 6,625,729 B1 | * | 9/2003 | Angelo et al. | 713/2 |
| 7,181,609 B2 | * | 2/2007 | Connor et al. | 713/2 |
| 7,200,758 B2 | * | 4/2007 | Zimmer | 713/192 |
| 7,206,933 B2 | * | 4/2007 | Strongin et al. | 713/168 |

* cited by examiner

*Primary Examiner*—Henry W Tsai
*Assistant Examiner*—Titus Wong
(74) *Attorney, Agent, or Firm*—Martine Penilla & Gencarella, LLP (57) ABSTRACT

An invention is provided for authenticating software associated with an embedded device on a motherboard. An embodiment includes executing an option ROM BIOS for the embedded device. If a bit pattern read from a first memory located on the host card does not match a predetermined bit pattern, the option ROM BIOS is terminated. In another embodiment, a first memory address is provided to the address lines of a memory device located on the host card and a first set of data is output from the memory device, followed by a second memory address to output a second set of data. The second memory address is equal to the first memory address plus the maximum addressable size of the memory device. The first set of data is compared to the second data, and the option ROM BIOS is terminated if the first and second sets of data do not match.

18 Claims, 8 Drawing Sheets

SYSTEM AND METHOD FOR AUTHENTICATION OF EMBEDDED RAID ON A HOST RAID CARD

CROSS REFERENCE TO RELATED APPLICATIONS

This application claims priority from provisional Application No. 60/543,642, filed Feb. 10, 2004, and is hereby incorporated by reference.

This application is also related to 1) U.S. patent application Ser. No. 10/741,234, filed Dec. 19, 2003, and entitled "System and Method for Authentication of Embedded RAID on a Motherboard Having an Input/Output Processor," and 2) U.S. patent application Ser. No. 10/740,971, filed Dec. 19, 2003, and entitled "System and Method for Authentication of Embedded RAID on a Motherboard," each of which is incorporated herein be reference.

BACKGROUND OF THE INVENTION

1. Field of the Invention

This invention relates generally to embedded controller software authentication, and more particularly to systems and methods for authentication of software associated with an embedded device on a host card.

2. Description of the Related Art

The use of personal computers has expanded remarkably in recent years. Modern personal computers are generally characterized by a flexible hardware architecture and a relatively open software architecture. The use of standardized hardware interfaces has permitted users to customize their personal computers to meet their particular hardware and software needs with greater ease than previously available. In consequence, a variety of input and output devices are available for most popular personal computers.

The open hardware interfaces increase the flexibility of the hardware since developers can more easily create programs using a common interface. For example, open hardware interfaces are often utilized for device controllers, which are used to access and control the various peripheral devices connected to a computer system. These controllers serve to coordinate and manage the data communication to and from the peripheral devices. Exemplary controllers include integrated drive electronics (IDE) controllers, small computer system interface (SCSI) controllers, and other similar chips that control peripheral devices.

Generally, controllers include a computer chip known as an application-specific integrated circuit (ASIC). ASICs are usually created for a specific purpose or application such as controlling SCSI devices, RAID arrays, or other similar devices. ASICs that manage SCSI devices are commonly known as SCSI chips. A SCSI controller generally includes a SCSI chip. By use of software device drivers, a host computer can instruct a SCSI chip to manage specific peripheral devices and control the data transfer between the peripheral device and the host computer. Often, controllers are included on host adapter cards as illustrated next with reference to FIG. 1.

Figure 1:
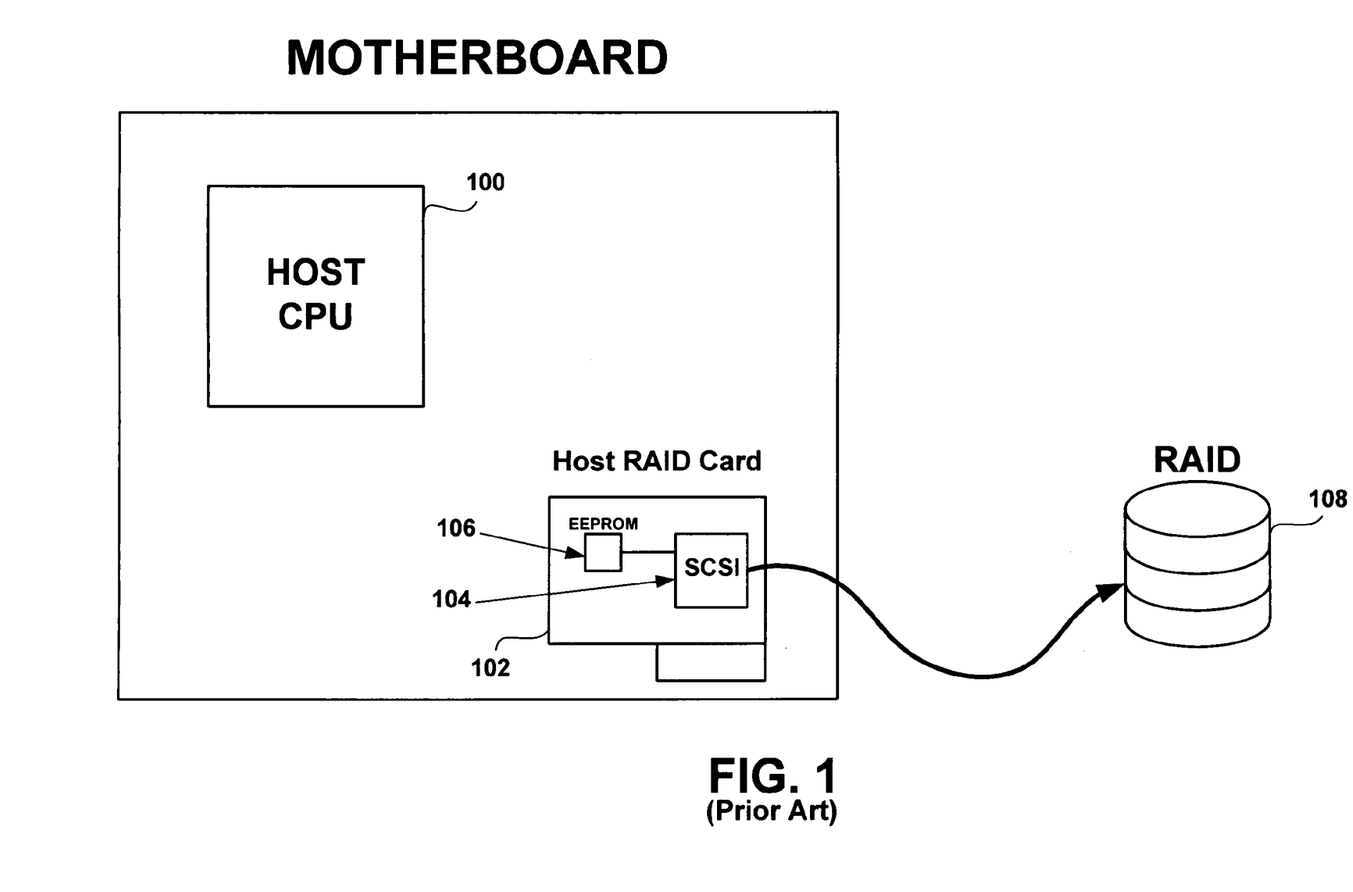
FIG. 1 is a block diagram showing a motherboard having a host RAID card for managing peripheral devices.

FIG. 1 is a block diagram showing a motherboard having a host RAID card for managing peripheral devices. The motherboard includes a host central processing unit (CPU) 100, and a host RAID card 102 having a SCSI controller 104 in communication with a SCSI peripheral device 108, which in this example is a redundant array of independent disks (RAID). In addition, a memory device 106, such as an electronically erasable programmable read only memory (EE-PROM) can be placed in communication with the SCSI controller 104 on the host RAID card 102.

In operation, the SCSI controller 104 on the host RAID card 102 manages the read and write operations to the RAID storage array 108. In addition, the SCSI controller 104 can obtain configuration information from the memory device 106, also located on the host RAID card 102. As mentioned above, the SCSI controller 104 uses a standardized open hardware interface that allows developers to create programs using a common interface, thus increasing the ease with which software is developed for the SCSI controller 104. Furthermore, the open interface architecture allows controller software to execute on a plurality of different controllers, manufactured by a plurality of different manufactures.

Unfortunately, the open interface architecture of the SCSI controller 104 also facilitates software piracy for software created for use with the controller 104. Moreover, although a SCSI controller is illustrated in FIG. 1, it should be noted that the potential for software piracy exist for all controllers having an open interface architecture. For example, since controller software can execute on a plurality of different controllers using the standardized interface, a host card manufacturer can copy software developed for controllers on other host cards, and use the software on their host cards. Thus, the pirating host card manufacturer avoids the cost and labor of developing the controller software, while the actual controller software developer is uncompensated. Even when memory device 106 is utilized to store particular configuration information, the pirating manufacturer can copy the contents of original memory device 106 onto their memory device, thus making their memory device function as though it was the original memory device 106.

In view of the foregoing, there is a need for systems and methods for authenticating embedded devices on host cards to ensure software is being executed on an appropriate device. In addition, the methods should preserve the industry open interface architecture.

SUMMARY OF THE INVENTION

Broadly speaking, embodiments of the present invention address these needs by utilizing predefined bit signatures for host card authentication. In this manner, software designed for the host card can check for the predefined signature before allowing the host card controller to be utilized. In one embodiment, a method for authenticating software associated with an embedded device on a host card is disclosed. The method includes executing an option ROM BIOS for the embedded device. A bit pattern is read from a first memory located on the host card and compared to a predetermined bit pattern. The option ROM BIOS is terminated when the read bit pattern does not match the predetermined bit pattern. In one aspect, the first memory can be a one time programmable (OTP) area of a flash memory device. In this case, the predetermined bit pattern can be programmed into the OTP area of a flash memory device during manufacturing of the host card. Optionally, the first memory can be a programmable logic device (PLD). As above, the predetermined bit pattern can be programmed into the PLD during manufacturing of the host card. To increase security, an EEPROM signature can be written to a second memory, such as an EEPROM, located on the host card when the read bit pattern matches the predetermined bit pattern. The EEPROM signature can be, for example, a pre-selected bit pattern. In this case, a device driver for the embedded device can check for the EEPROM signature and be terminated when the EEPROM signature is not present in the second memory.

A further method for authenticating software associated with an embedded device on a host card is disclosed in an additional embodiment of the present invention. As above, the method includes executing an option ROM BIOS for the embedded device. A first memory address is provided to the address lines of a memory device located on the host card and a first set of data is output from the memory device. In addition, a second memory address is provided to address lines of the memory device located on the host card. The second memory address is equal to the first memory address plus the maximum addressable size of the memory device. Again, a second set of data is output from the memory device. The first set of data is compared to the second data, and the option ROM BIOS is terminated when the first set of data does not match the second set of data. In one aspect, the memory device is a wrap around flash memory device, which is configured such that the first memory address and the second memory address access the same physical memory location. Similar to above, an EEPROM signature can be written to a second memory located on the host card when the first set of data matches the second set of data. In this case, a device driver for the embedded device can be terminated when the EEPROM signature is not present in the second memory.

A system for authenticating software associated with an embedded device on a host card is disclosed in a further embodiment of the present invention. The system includes a flash memory device that stores an option ROM BIOS for the embedded device. Also included is a first memory device that stores a bit pattern. In operation, the option ROM BIOS reads the bit pattern from the first memory device and compares the read bit pattern to a predetermined bit pattern. When the read bit pattern does not match the predetermined bit pattern, the option ROM BIOS is terminated. As above, the first memory device can be an OTP area of the flash memory device that can be programmed with the predetermined bit pattern during manufacturing of the host card. Optionally, the first memory device can be a PLD, which can be programmed with the predetermined bit pattern during manufacturing of the host card. The system can further include an EEPROM. In this aspect, the option ROM BIOS can write an EEPROM signature to the EEPROM when the read bit pattern matches the predetermined bit pattern. As above, the EEPROM signature can be a pre-selected bit pattern. Also in this aspect, a device driver for the embedded device can be terminated when the EEPROM signature is not present in the EEPROM. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for authentication of software associated with embedded controllers on host cards. In general, embodiments of the present invention utilize predefined bit signatures for host card authentication. In this manner, software designed for the host card can check for the predefined signature before allowing the host card controller to be utilized. In this manner, software can be made to execute only on a particular host card, thus preventing usage of the software on other host cards. As a result, software copied from one host card to another host card will not execute, thus avoiding unauthorized software use. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 2A:
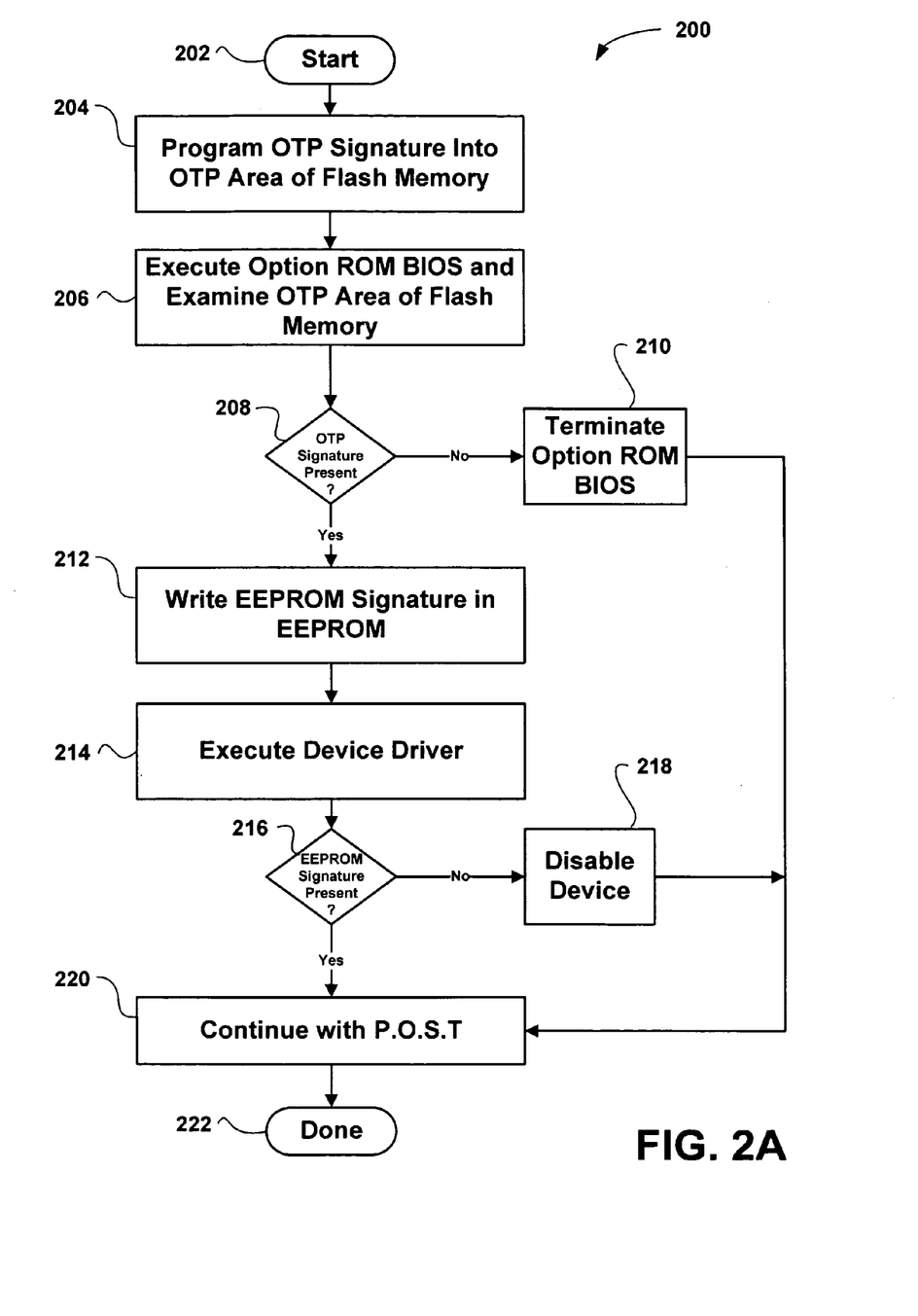
FIG. 2A is a flowchart showing a method for authenticating software associated with an embedded device on a host card using a flash memory having a one time programmable (OTP) area, in accordance with an embodiment of the present invention.

FIG. 1 was described in terms of the prior art. FIG. 2A is a flowchart showing a method 200 for authenticating software associated with an embedded device on a host card using a flash memory having a one time programmable (OTP) area, in accordance with an embodiment of the present invention. In an initial operation 202, preprocess operations are performed. Preprocess operations can include, for example, manufacturing the host card board, developing predefined authentication signatures, and other preprocess operations that will be apparent to those skilled in the art after a careful reading of the present disclosure.

Figure 2B:
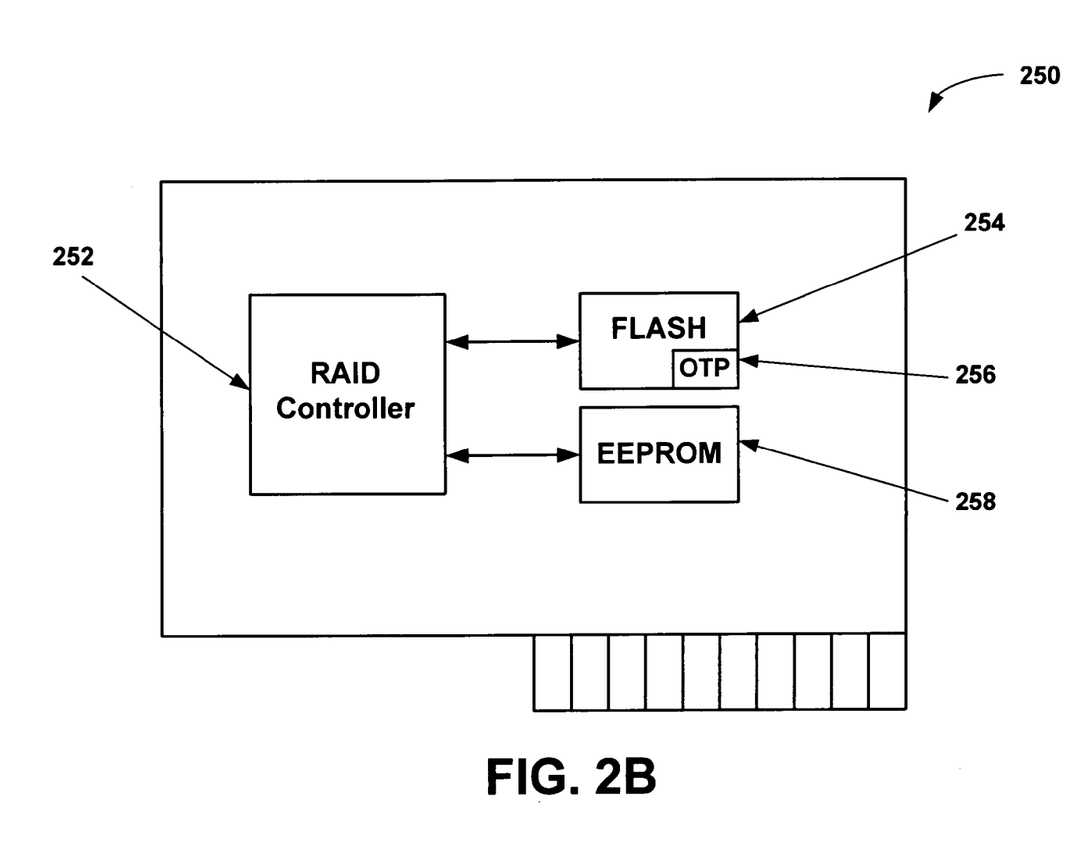
FIG. 2B is a block diagram showing an exemplary host card having an OTP signature for authenticating software associated with an embedded device on a host card, in accordance with an embodiment of the present invention.

In operation 204, an OTP area of flash memory for the host card is programmed with an OTP signature. The OTP signature is a particular bit pattern pre-selected for use in authenticating the host card, as illustrated in FIG. 2B. FIG. 2B is a block diagram showing an exemplary host card 250 having an OTP signature for authenticating software associated with an embedded device on a host card, in accordance with an embodiment of the present invention. The host card 250 includes a RAID controller 252 coupled to a flash memory device 254 having an OTP area 256. In addition, the RAID controller 252 is coupled to a separate EEPROM 258. As will be appreciated by those skilled in the art, a host card, such as the RAID host card 250, is designed to be inserted into a motherboard using bus slot, such as a peripheral component interconnect (PCI) bus slot. Although a RAID based host card is illustrated in FIG. 2B, it should be noted that the embodiments of the present invention can be utilized to verify software for use with any type of host card utilized in a computer system.

As mentioned above, the flash memory device 254 includes an OTP area 256, which is an area of memory that cannot be altered once programmed. Flash memory devices include memory that can be rewritten and hold its content without power. Flash chips replaced earlier ROM BIOS chips in computer systems so that the BIOS could be updated in place instead of being replaced. The flash memory device 254 includes the OTP area 256 that can be programmed once, during manufacturing. Hence, embodiments of the present invention utilize the OTP area 256 of the flash memory device 254 to store a particular bit pattern that is pre-selected for use in authenticating the host card. This bit pattern programmed into the OTP area 256 will be referred to as an "OTP signature." In addition, the flash memory device 254 stores an option ROM BIOS for the RAID controller 252. Thus, in one embodiment, each host card 250 is provided to the user having a flash memory device 254 that includes the option ROM BIOS for the RAID controller 252 and an OTP signature programmed into the OTP area 256 of the flash memory device 254.

Referring back to FIG. 2A, the option ROM BIOS is executed and examines the OTP area of the flash memory device, in operation 206. Turing to FIG. 2B, once manufactured, the host card 250 is provided to a user, and is installed in a bus slot of a computer system, such as a PCI bus slot. Once installed, the computer system can be booted and power provided to the host card 250. During the initial stages of startup, the option ROM BIOS for the RAID controller 252, which is stored in the flash memory device 254, is executed. To verify that the option ROM BIOS is being executed on an appropriate host card, the option ROM BIOS reads the OTP signature from the OTP area 256 of the flash memory device 254.

Turing back to FIG. 2A, a decision is then made in operation 208 as to whether the correct OTP signature is present in the OTP area of the flash memory device. If the correct OTP signature is present in the OTP area of the flash memory device, the method 200 continues to operation 212. Otherwise, the method 200 branches to operation 210, wherein the option ROM BIOS is terminated. As can be appreciated, because of the OTP signature check, the option ROM BIOS will not run on a host card that does not include the appropriate OTP signature stored in the OTP area of the flash memory device. Thus, if the option ROM BIOS is copied to an inappropriate host card, the option ROM BIOS will not run because the OTP signature will not be found in the flash memory device.

However, when the correct OTP signature is present in OTP area of the flash memory device, an EEPROM signature is written to an EEPROM coupled to the controller, in operation 212. Referring to FIG. 2B, once the option ROM BIOS verifies that the correct OTP signature is present in the OTP area 256 of the flash memory device 254, the option ROM BIOS writes a particular bit pattern that is pre-selected for use in authenticating the host card to the EEPROM 258. This bit pattern programmed into the EEPROM 258 will be referred to as an "EEPROM signature." It should be noted that the EEPROM signature can actually comprise a plurality of bit signatures written to various addresses in the EEPROM, depending on the needs of the manufacturer.

Turning back to FIG. 2A, a device driver for the controller is executed in operation 214. The device driver provides an interface between the system operating system and the end device, in the example of FIG. 2B, a RAID drive. It should further be noted that when the device driver is updated without restarting the computer system, the method 200 begins at operation 214. That is, embodiments of the present invention allow the device driver to be updated without restarting the system, yet still provide protection from unauthorized use.

A decision is then made as to whether the EEPROM signature is present in the EEPROM, in operation 216. Referring to FIG. 2B, when the device driver is executed, including when the device driver is updated, the device driver examines the EEPROM 258 to determine if the EEPROM signature is present in the EEPROM 258. As described above, the option ROM BIOS writes the EEPROM signature to the EEPROM 258 to indicate the host card 250 has been authenticated. In this manner, the EEPROM signature can be checked to verify authentication whenever the driver is updated without requiring a system reboot. Referring back to FIG. 2A, if the EEPROM signature is present in the EEPROM the method 200 continues with operation 220. Otherwise, the method 200 branches to operation 218, wherein the device is disabled. That is, if the EEPROM signature is not found, the device driver will not enable the RAID device for use.

In operation 220, the system BIOS for the computer system continues with the usual P.O.S.T. startup operations. Post process operations are then performed in operation 222. Post process operations can include for example, device operations, and other post process operations that will be apparent to those skilled in the art. In this manner, embodiments of the present invention advantageously allow authentication of device software to protect against software piracy when using an open interface device.

The flash memory device having the OTP area provides an effective means for authenticating the host card. Since the OTP area cannot be altered once programmed, unauthorized users cannot change the contents of an OTP area. However, flash memory devices having OTP areas can have an above average cost associated with them. As such, a cheaper authentication mechanism can be achieved using a programmable logic device (PLD), as discussed next with reference to FIG. 3A.

Figure 3A:
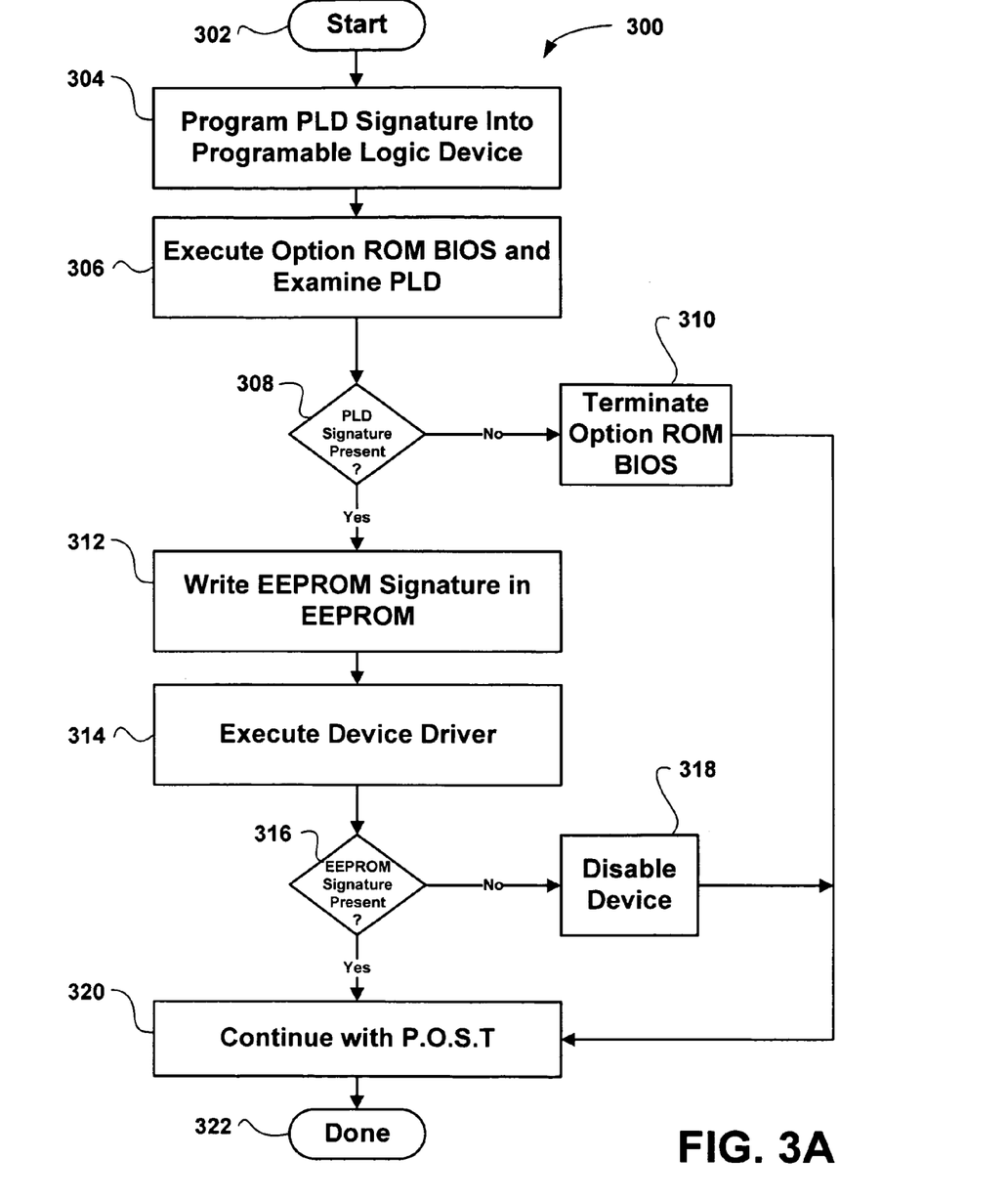
FIG. 3A is a flowchart showing a method for authenticating software associated with an embedded device on a host card using a PLD, in accordance with an embodiment of the present invention.

FIG. 3A is a flowchart showing a method 300 for authenticating software associated with an embedded device on a host card using a PLD, in accordance with an embodiment of the present invention. In an initial operation 302, preprocess operations are performed. Preprocess operations can include, for example, manufacturing the host card board, developing predefined authentication signatures, and other preprocess operations that will be apparent to those skilled in the art after a careful reading of the present disclosure.

Figure 3B:
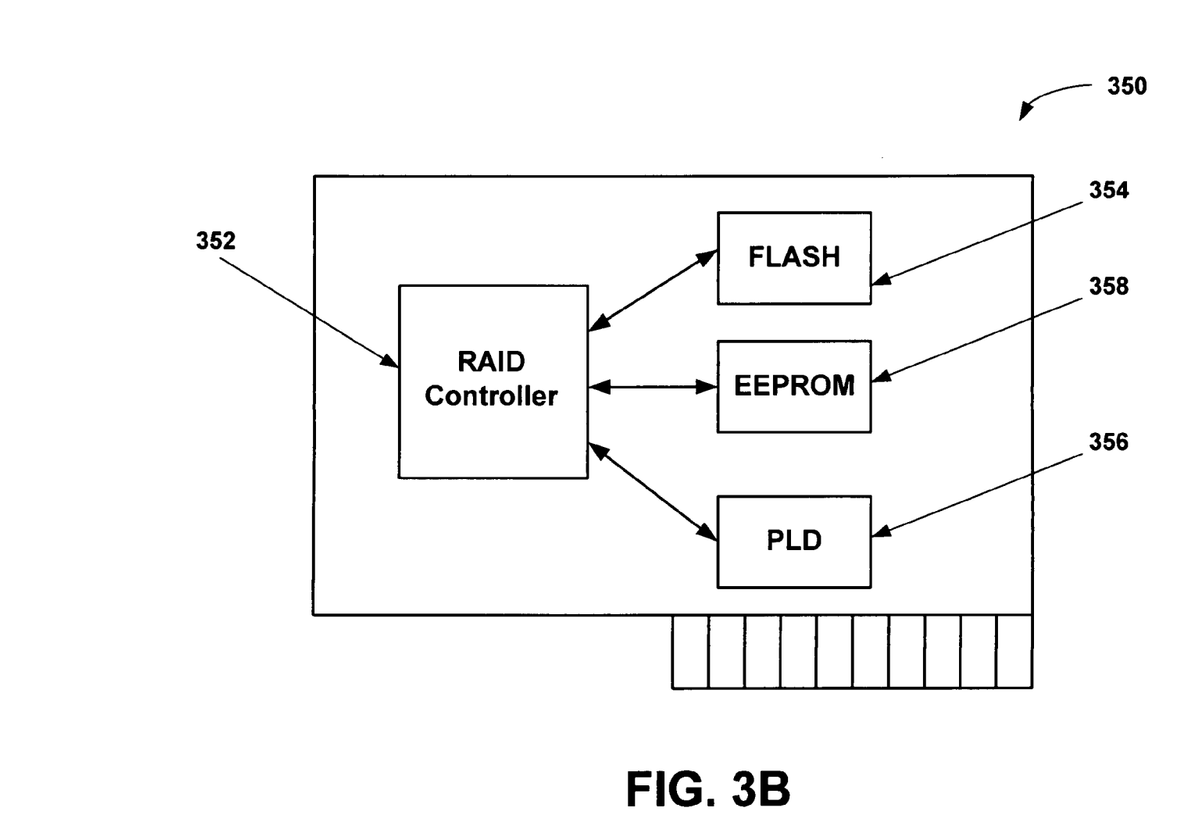
FIG. 3B is a block diagram showing an exemplary host card having a PLD signature for authenticating software associated with an embedded device on a host card, in accordance with an embodiment of the present invention.

In operation 304, a PLD on the host card is programmed with a PLD signature. Similar to the signatures described above, the PLD signature is a particular bit pattern pre-selected for use in authenticating the host card, as illustrated in FIG. 3B. FIG. 3B is a block diagram showing an exemplary host card 350 having a PLD signature for authenticating software associated with an embedded device on a host card, in accordance with an embodiment of the present invention. The host card 350 includes a RAID controller 352 coupled to a flash memory device 354, a PLD 356, and an EEPROM 358. As above, the host card 350 is designed to be inserted into a motherboard using bus slot, such as a PCI bus slot. Although a RAID based host card is illustrated in FIG. 3B, it should be noted that the embodiments of the present invention can be utilized to verify software for use with any type of host card utilized in a computer system.

The PLD 356 can be any type of programmable logic device, such as a programmable array logic (PAL), EEPROM, flash memory, or RAM based device. As will be appreciated by those skilled in the art, a PAL is a permanent fuse based memory, which blows apart lines or fuses lines together by electrically melting an aluminum trace or insulator. EEPROM and flash memory based PLDs cause a transistor to open or close depending on the contents of its associated memory cell. A RAM based PLD has its contents loaded each time during startup, which means a RAM based PLD is dynamic and volatile.

The PLD 356 can be programmed during manufacturing. Hence, embodiments of the present invention utilize the PLD 356 to store a particular bit pattern that is pre-selected for use in authenticating the host card. This bit pattern programmed into the PLD 356 will be referred to as a "PLD signature." As above, the flash memory device 354 stores an option ROM BIOS for the RAID controller 352. Thus, in one embodiment, each host card 350 is provided to the user having a PLD signature stored in the PLD 356 and a flash memory device 354 that includes the option ROM BIOS for the RAID controller 352.

Referring back to FIG. 3A, the option ROM BIOS is executed and examines the PLD, in operation 306. Turing to FIG. 3B, once manufactured, the host card 350 is provided to a user, and is installed in a bus slot of a computer system, such as a PCI bus slot. Once installed, the computer system can be booted and power provided to the host card 350. During the initial stages of startup, the option ROM BIOS for the RAID controller 352, which is stored in the flash memory device 354, is executed. To verify that the option ROM BIOS is being executed on an appropriate host card, the option ROM BIOS reads the PLD signature from the PLD 356.

Turing back to FIG. 3A, a decision is then made in operation 308 as to whether the correct PLD signature is present in the PLD. If the correct PLD signature is present in the PLD, the method 300 continues to operation 312. Otherwise, the method 300 branches to operation 310, wherein the option ROM BIOS is terminated. As can be appreciated, because of the PLD signature check, the option ROM BIOS will not run on a host card that does not include the appropriate PLD signature stored in the PLD. Thus, if the option ROM BIOS is copied to an unauthorized host card, the option ROM BIOS will not run because the PLD signature will not be found in PLD. Moreover, the unauthorized host card may not include a PLD, which also causes the option ROM BIOS to terminate in operation 310.

However, when the correct PLD signature is present in PLD, an EEPROM signature is written to an EEPROM coupled to the controller, in operation 312. Referring to FIG. 3B, once the option ROM BIOS verifies that the correct PLD signature is present in the PLD 356, the option ROM BIOS writes a particular bit pattern that is pre-selected for use in authenticating the host card to the EEPROM 358. As discussed above, this bit pattern programmed into the EEPROM 358 is the "EEPROM signature." It should be noted that the EEPROM signature can actually comprise a plurality of bit signatures written to various addresses in the EEPROM, depending on the needs of the manufacturer.

Turning back to FIG. 3A, a device driver for the controller is executed in operation 314. The device driver provides an interface between the system operating system and the end device, in the example of FIG. 3B, a RAID drive. It should further be noted that when the device driver is updated without restarting the computer system, the method 300 begins at operation 314. That is, as with the OTP authorization discussed above, embodiments of the present invention allow the device driver to be updated without restarting the system using a PLD based system, yet still provide protection from unauthorized use.

A decision is then made as to whether the EEPROM signature is present in the EEPROM, in operation 316. Referring to FIG. 3B, when the device driver is executed, including when the device driver is updated, the device driver examines the EEPROM 358 to determine if the EEPROM signature is present in the EEPROM 358. As described above, the option ROM BIOS writes the EEPROM signature to the EEPROM 358 to indicate the host card 350 has been authenticated. In this manner, the EEPROM signature can be checked to verify authentication whenever the driver is updated without requiring a system reboot. Referring back to FIG. 3A, if the EEPROM signature is present in the EEPROM the method 300 continues with operation 320. Otherwise, the method 300 branches to operation 318, wherein the device is disabled. That is, if the EEPROM signature is not found, the device driver will not enable the RAID device for use.

In operation 320, the system BIOS for the computer system continues with the usual P.O.S.T. startup operations. Post process operations are then performed in operation 322. Post process operations can include for example, device operations, and other post process operations that will be apparent to those skilled in the art. In this manner, embodiments of the present invention advantageously allow authentication of device software to protect against software piracy when using an open interface device. In addition to the OTP based flash memory and PLD based authentication embodiments described above, embodiments of the present invention can also utilize a "wrap around flash memory" device to authenticate the host card, as described next with reference to FIG. 4A.

Figure 4A:
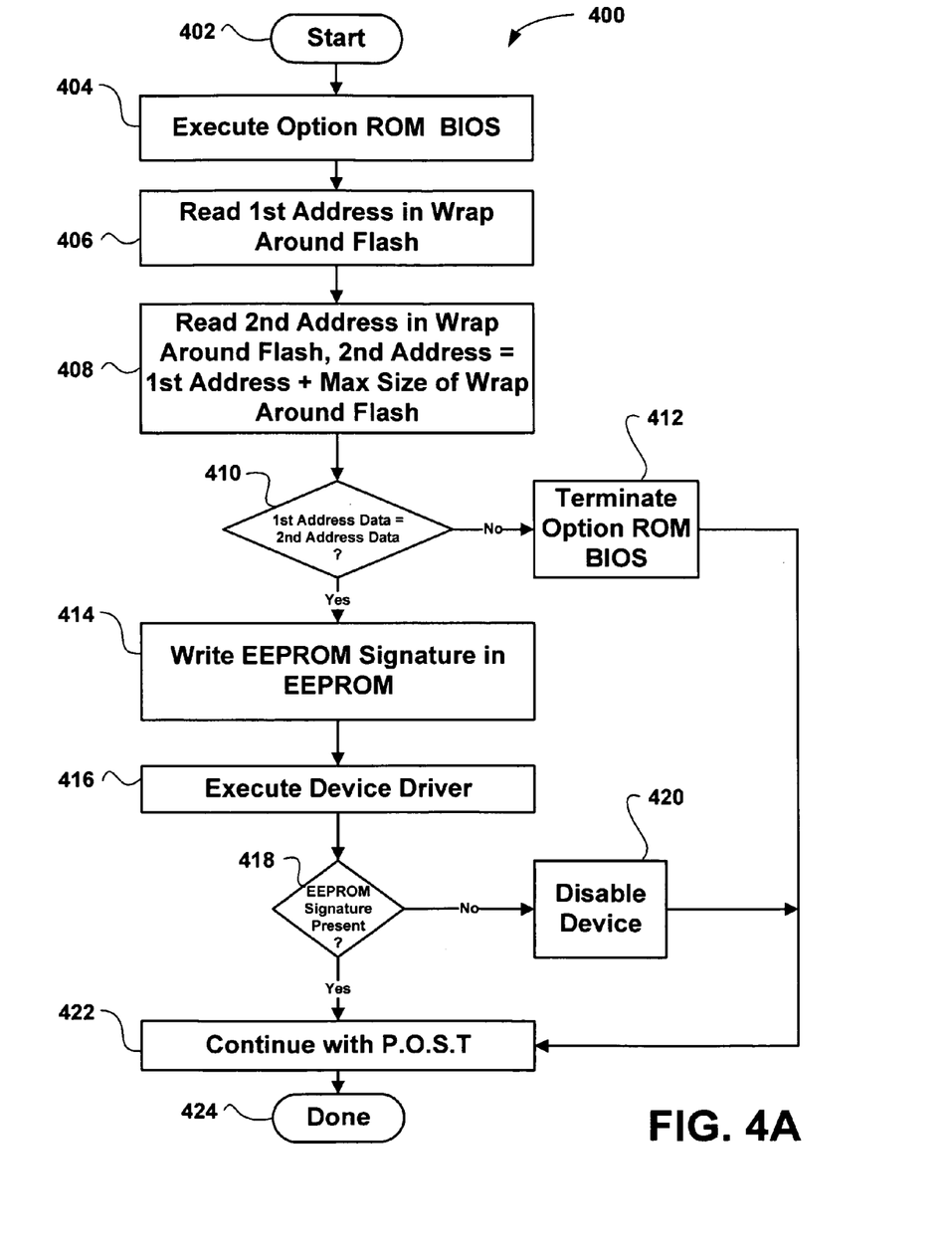
FIG. 4A is a flowchart showing a method for authenticating software associated with an embedded device on a host card using a wrap around flash memory, in accordance with an embodiment of the present invention.

FIG. 4A is a flowchart showing a method 400 for authenticating software associated with an embedded device on a host card using a wrap around flash memory, in accordance with an embodiment of the present invention. In an initial operation 402, preprocess operations are performed. Preprocess operations can include, for example, manufacturing the host card board, developing predefined authentication signatures, and other preprocess operations that will be apparent to those skilled in the art after a careful reading of the present disclosure.

Figure 4B:
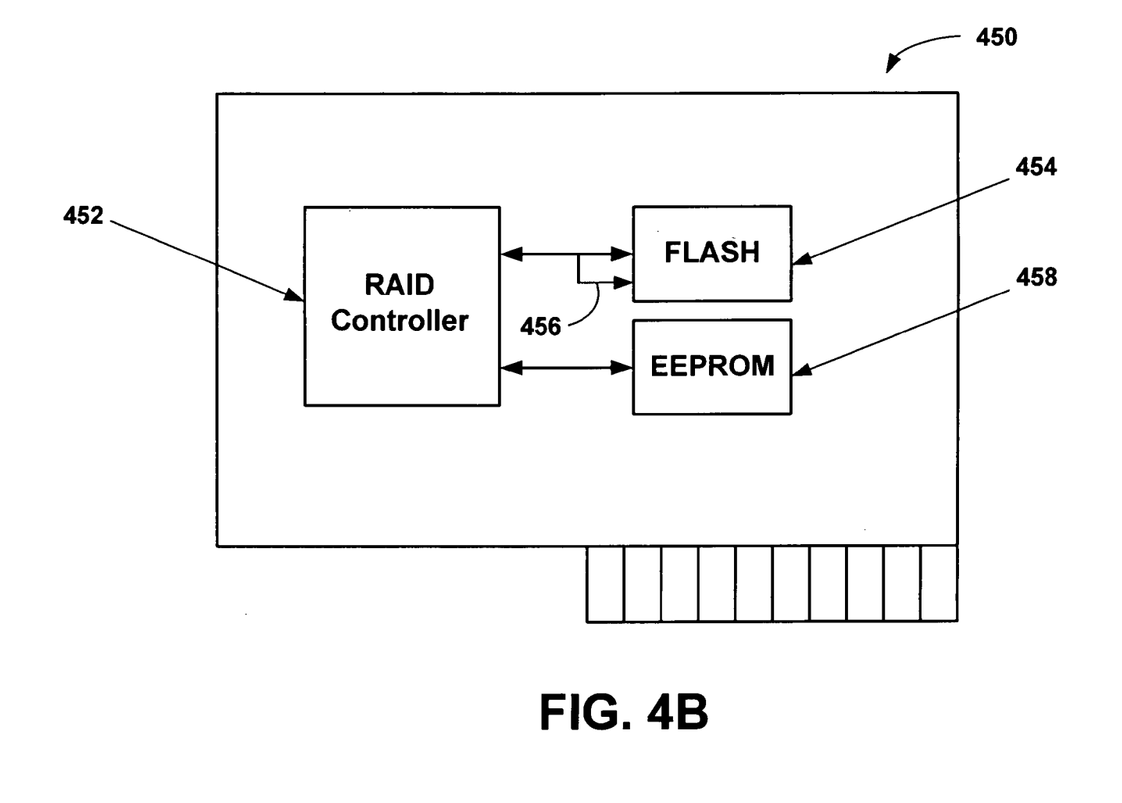
FIG. 4B is a block diagram showing an exemplary host card having a wrap around flash memory for authenticating software associated with an embedded device on a host card, in accordance with an embodiment of the present invention.

In operation 404, the option ROM BIOS for the controller is executed. Similar to above, the option ROM BIOS will examine memory on the host card to authenticate the host card. However, in the embodiment of FIG. 4A, a wrap around flash memory is utilized for authentication, as illustrated in FIG. 4B. FIG. 4B is a block diagram showing an exemplary host card 450 having a wrap around flash memory for authenticating software associated with an embedded device on a host card, in accordance with an embodiment of the present invention. The host card 450 includes a RAID controller 452 coupled to a wrap around flash memory device 454. As illustrated in FIG. 4B, an extra address line 456 is coupled to the address pins of the wrap around flash memory device 454. As will be explained in greater detail subsequently, the extra address line 456 allows addresses greater than the maximum address size of the wrap around flash memory 454 to be provided on the address pins of the wrap around flash memory device 454. When this occurs, the address will actually "wrap around" to the beginning of the flash memory space, as discussed in greater detail below. The wrap around flash memory device 454 stores an option ROM BIOS for the RAID controller 452. The host card 450 further includes an EEPROM 458 coupled to the RAID controller 452. As above, the host card 450 is designed to be inserted into a motherboard using bus slot, such as a PCI bus slot. Also as above, it should be noted that the embodiments of the present invention can be utilized to verify software for use with any type of host card utilized in a computer system, and are not limited to RAID based host cards as illustrated in FIG. 4B.

Referring back to FIG. 4A, the option ROM BIOS reads a first address in the wrap around flash memory device, in operation 406. Turing to FIG. 4B, once manufactured, the host card 450 is provided to a user, and is installed in a bus slot of a computer system, such as a PCI bus slot. Once installed, the computer system can be booted and power provided to the host card 450. During the initial stages of startup, the option ROM BIOS for the RAID controller 452, which is stored in the wrap around flash memory device 454, is executed. To verify that the option ROM BIOS is being executed on an appropriate host card, the option ROM BIOS reads a first address in the wrap around flash memory device 454. The data contents at the first address will be used to authenticate the host card 450, as described below.

Figure 5:
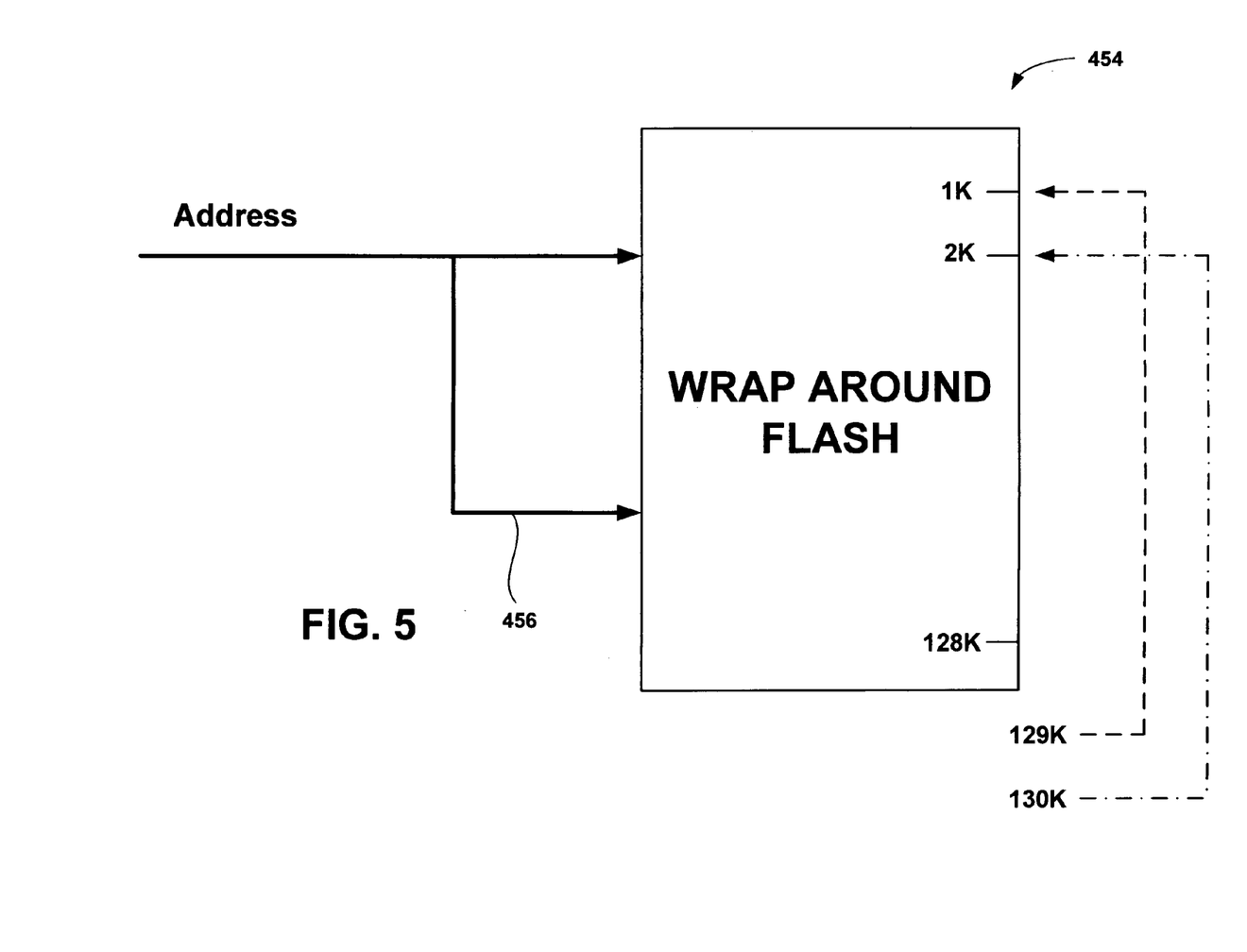
FIG. 5 is a block diagram showing an exemplary wrap around flash memory device, in accordance with an embodiment of the present invention.

Referring back to FIG. 4A, the option ROM BIOS reads a second address in the wrap around flash memory device that is equal to the first address plus the maximum size of the wrap around flash memory, in operation 408. FIG. 5 is a block diagram showing an exemplary wrap around flash memory device 454, in accordance with an embodiment of the present invention. In a conventional flash memory, when an address beyond the maximum addressable range of the memory is received, the conventional flash memory will provide a predefined output, such as FFFF hex. However, as mentioned above, an extra address line 456 is coupled to the wrap around flash memory device 454, which allows addresses greater than the maximum address size of the wrap around flash memory to be provided on the address pins of the wrap around flash memory device 454. When this occurs, the address will actually "wrap around" to the beginning of the flash memory space.

For example, the exemplary wrap around flash memory device 454 of FIG. 5 has a maximum addressable memory space of 128K. Hence, the normal range of addressable data is from 0-128K. For example, when 1K address space is accessed, the data stored at address 1K is output on the output pins of the wrap around memory device. Similarly, when 2K address space is accessed, the data stored at address 2K is output on the output pins of the wrap around memory device. However, because of the extra address line 456, when an address above 128K is provided to the system, the data at an address that is located 128K, which is the maximum memory size, lower than the provided address is accessed. For example, when an address of 129K is addressed, the wrap around flash memory device 454 will actually access the 1K memory address (129K−128K=1K). Thus, the data located at address 1K can be accessed using either address 1K or address 129K. Similarly, when an address of 130K is addressed, the wrap around flash memory device 454 will actually access the 2K memory address (130K−128K=2K).

As illustrated in operation 410 of FIG. 4A, a decision is then made as to whether the data at the first address accessed is equal to the data at the second address accessed. Using the wrap around memory, when the second address accessed is equal to the first address plus the maximum size of the wrap around flash memory, the second address will actually access the same data that the first address accessed. Hence, if the data at the first address accessed is equal to the data at the second address accessed, the method continues with operation 414. Otherwise, the option ROM BIOS is terminated in operation 412. Since the data at first address accessed is not equal to the data at the second address accessed, in operation 412, the option ROM BIOS is being executed on a host card that does not include the wrap around flash, and thus the host card is not authorized to execute the option ROM BIOS.

However, when the data at the first address accessed is equal to the data at the second address accessed, an EEPROM signature is written to an EEPROM coupled to the controller, in operation 414. Referring to FIG. 4B, once the option ROM BIOS verifies that the data at the first address accessed is equal to the data at the second address accessed, the option ROM BIOS writes a particular bit pattern that is pre-selected for use in authenticating the host card to the EEPROM 458. As discussed above, this bit pattern programmed into the EEPROM 458 is the "EEPROM signature." It should be noted that the EEPROM signature can actually comprise a plurality of bit signatures written to various addresses in the EEPROM, depending on the needs of the manufacturer.

Turning back to FIG. 4A, a device driver for the controller is executed in operation 416. The device driver provides an interface between the system operating system and the end device, in the example of FIG. 4B, a RAID drive. It should further be noted that when the device driver is updated without restarting the computer system, the method 400 begins at operation 416. That is, as with the OTP and PLD authorization embodiments discussed above, embodiments using a wrap around flash allow the device driver to be updated without restarting the system, yet still provide protection from unauthorized use.

A decision is then made as to whether the EEPROM signature is present in the EEPROM, in operation 418. Referring to FIG. 4B, when the device driver is executed, including when the device driver is updated, the device driver examines the EEPROM 458 to determine if the EEPROM signature is present in the EEPROM 458. As described above, the option ROM BIOS writes the EEPROM signature to the EEPROM 458 to indicate the host card 450 has been authenticated. In this manner, the EEPROM signature can be checked to verify authentication whenever the driver is updated without requiring a system reboot. Referring back to FIG. 4A, if the EEPROM signature is present in the EEPROM the method 400 continues with operation 422. Otherwise, the method 400 branches to operation 420, wherein the device is disabled. That is, if the EEPROM signature is not found, the device driver will not enable the RAID device for use.

In operation 422, the system BIOS for the computer system continues with the usual P.O.S.T. startup operations. Post process operations are then performed in operation 424. Post process operations can include for example, device operations, and other post process operations that will be apparent to those skilled in the art. In this manner, embodiments of the present invention advantageously allow authentication of device software to protect against software piracy when using an open interface device.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include read-only memory, random-access memory, CD-ROMs, CD-Rs, CD-RWs, magnetic tapes, and other optical data storage devices. The computer readable medium can also be distributed over network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for authenticating software associated with an embedded device on a host card, comprising the operations of: storing an option ROM BIOS in flash memory on the host card; separately storing during manufacturing of the host card, a predetermined bit pattern in a first memory located on the host card; executing during system startup, the option ROM BIOS for the embedded device; reading, by the option ROM BIOS, a second bit pattern from the first memory; comparing the second bit pattern to the predetermined bit pattern; writing a signature to a second memory located on the host card when the second bit pattern matches the predetermined bit pattern, wherein the option ROM BIOS is terminated if the host card includes the predetermined bit pattern stored in the first memory that does not match the second bit pattern; and continuing post process startup operations even when the option ROM BIOS is terminated.

2. A method as recited in claim 1, wherein the first memory is a one time programmable (OTP) area of the flash memory on the host card.

3. A method as recited in claim 1, wherein the first memory is a programmable logic device (PLD).

4. A method for authenticating software associated with an embedded device on a host card, comprising the operations of, executing during system startup, an option ROM BIOS for the embedded device; reading, by the option ROM BIOS, a first bit pattern from a first memory; comparing the first bit pattern to a predetermined bit pattern; writing a signature to a second memory located on the host card when the first bit pattern matches the predetermined bit pattern, wherein the option ROM BIOS is terminated if the host card includes the predetermined bit pattern stored in the first memory that does not match the first bit pattern, wherein the signature is a pre-selected bit pattern for use in authenticating the host card; and continuing post process startup operations even when the option ROM BIOS is terminated.

5. A method as recited in claim 1, further comprising the operation of checking a device driver for the embedded device every time the device driver is started, wherein if the signature is not present in the second memory the device driver will be terminated, else the device driver continues, whereby allowing an update of the device driver without restarting the system.

6. A method as recited in claim 5, wherein the second memory is an electronically erasable programmable read only memory (EEPROM).

7. A system for authenticating software associated with an embedded device on a host card, comprising: a flash memory device storing an option ROM BIOS for the embedded device; a first memory device being programmed during manufacturing of the host card with a predetermined bit pattern; and an electronically erasable programmable read only memory (EEPROM), wherein the option ROM BIOS reads during startup of the option ROM BIOS a second bit pattern from the first memory device and compares the second bit pattern to the predetermined bit pattern, wherein the option ROM BIOS writes a signature to the EEPROM when the second bit pattern matches the predetermined bit pattern, wherein the option ROM BIOS is terminated if the host card includes the predetermined bit pattern stored in the first memory device that does not match the second bit pattern, wherein the system continues post process startup operations even if the option ROM BIOS is terminated.

8. A system as recited in claim 7, wherein the first memory device is a one time programmable (OTP) area of the flash memory device.

9. A system as recited in claim 7, wherein the first memory device is a programmable logic device (PLD).

10. A system as recited in claim 7, wherein the signature is a pre-selected bit pattern for use in authenticating the host card.

11. A system as recited in claim 7, wherein a device driver for the embedded device is checked every time the device driver is started and the device driver is terminated when the signature is not present in the EEPROM, else the device driver continues.

12. A method for authenticating software associated with an embedded device on a host card, comprising the operations of: executing during system startup, an option ROM BIOS for the embedded device; providing a first memory address to address lines of a memory device located on the host card, wherein a first set of data is output from the memory device; providing a second memory address to address lines of the memory device located on the host card, the second memory address being equal to the first memory address plus the maximum addressable size of the memory device, wherein a second set of data is output from the memory device; comparing the first set of data to the second set of data; writing a signature to a second memory located on the host card when the first set of data matches the second set of data, wherein the option ROM BIOS is terminated if the host card includes the first set of data stored in the memory device that does not match the second set of data stored in the memory device; and continuing post process startup operations even when the option ROM BIOS is terminated.

13. A method as recited in claim 12, wherein the memory device is a wrap around flash memory device, wherein the first memory address and the second memory address access a same physical memory location.

14. A method as recited in claim 12, further comprising the operation of checking a device driver for the embedded device every time the device driver is started, wherein if the signature is not present in the second memory the device driver will be terminated, else the device driver continues, whereby allowing the update of the device driver without restarting the system.

15. A method as recited in claim 14, wherein the second memory is an electronically erasable programmable read only memory (EEPROM).

16. A method as recited in claim 1, wherein the host card includes a RAID controller coupled to the flash memory.

17. A method as recited in claim 16, wherein the RAID controller is coupled to the second memory on the host card.

18. A method as recited in claim 1, wherein the signature comprises a plurality of bit signatures written to a plurality of addresses in the second memory.

* * * * *